Patented Dec. 14, 1937

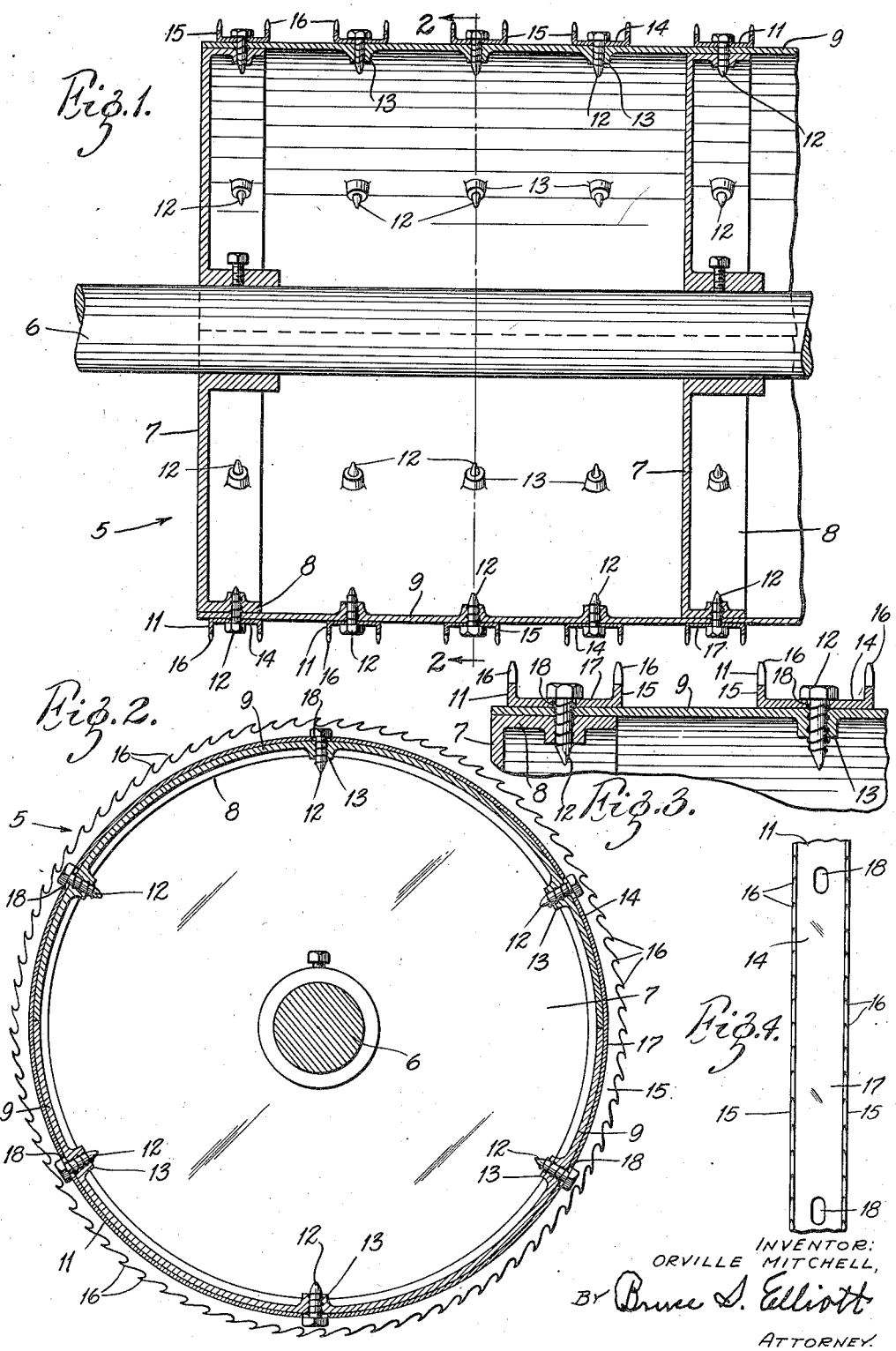

2,102,085

UNITED STATES PATENT OFFICE 2,102,085

COTTON EXTRACTING SAW CYLINDER

Orville Mitchell, Dallas, Tex.

Application February 10, 1936, Serial No. 63,169

3 Claims. (Cl. 19—63)

This invention relates to certain new and useful improvements in saw cylinders for cotton extracting machines, and is directed more particularly to an improved construction of saw band, a number of which are adapted to be secured about the drum of the saw cylinder at equal distances apart.

The saw band forming the subject matter of this invention is briefly described in the specification of my prior Patent No. 2,003,262, dated May 28, 1935; and is shown in position on the drum of the cylinder in Figure 1 of said patent. No claim is made in said patent however, to the features of construction herein claimed, nor is any claim made to the saw band itself as an article of manufacture. This application, therefore, is to be considered as allied in subject matter with that of my said prior patent.

The present invention is characterized by a channel shaped saw band, provided with elongated openings in the base of the channel at intervals throughout its length to accommodate the screws used in securing the band to the drum, so as to enable said screws to engage in the aperture for receiving the same provided in the drum in cases where slight variations in the diameter of the drum would throw ordinary circular openings in the band out of register with the apertures in the periphery of the drum.

This condition had previously proved a serious disadvantage, necessitating enlarging lengthwise the openings in the bands before the screws could be driven in the prepared apertures in the drum.

According to my invention, the base of the channel in the saw band is provided initially with elongated openings, so that when the bands are placed about the drum some part of each opening will register with a corresponding aperture in the drum, enabling the screws to be readily driven into said apertures.

The drum of the saw cylinder is made of sheet metal, preferably in sections; when light or thin gauge metal is used the metal surrounding the apertures for receiving the screws is extended, or extruded inwardly, and self-threading, or airplane screws are used which, when driven into these apertures through the openings in the saw bands operate to hold the bands securely on the drum, with no liability of the screws working loose.

The invention is illustrated in the accompanying drawing in which:

Figure 1 is a longitudinal vertical section through a saw cylinder provided with my improved saw band;

Figure 2 is a longitudinal sectional view taken on the line 2—2 of Figure 1;

Figure 3 is an enlarged sectional view of a portion of the saw cylinder; and

Figure 4 is a developed plan view of the saw band.

Referring now to the drawing, the numeral 5 indicates, generally, a saw cylinder provided with my improved saw bands, said cylinder comprising a shaft, 6, having flanged disks, 7, secured at intervals around their peripheries to receive securing screws. The drum of the cylinder is formed by a sheet metal houing, 9, which may be made in sections, which sections are placed in position about the flanges 8. The improved saw bands, 11, are then caused to encircle the housing and secured in position by self-threading, or air-plane screws, 12. Certain of the saw bands corresponding to the number of flanged disks 7 employed are caused to correspond, in position, respectively, to these disks, and in these cases, as shown at the left of Figure 3, the screws 12 pass through openings in the base of the saw bands and are driven into aligning apertures provided in the housing and flange. At other points throughout the length of the cylinder, that is, in spaces between the disks, the metal surrounding the screw-receiving apertures in the housing is extended, or extruded, inwardly, as indicated at, 13, and the screws 12 are passed through openings in the base of the saw band and driven into these inclosed openings.

It will be understood that thin-gauge metal will not provide walls of sufficient thickness to form a purchase, or engaging surface, for the screws and hence the necessity of extending the metal of the housing inward at points surrounding the screw-receiving apertures in the housing. With heavy gauge metal, however, this is not necessary.

As heretofore indicated, the drums constructed in the manner described will often vary in circumference, so that when the saw bands are caused to encircle the drum ordinary circular openings through which the securing screws are designed to pass will not register with the screw-receiving apertures in the housing, and it is therefore impossible to secure the screws in position without removing the saw bands and enlarging one or more of the apertures therein, or even punching new apertures in the saw band. To overcome this difficulty, I provide saw bands constructed as will now be described.

Each of the saw bands 11 comprises a flat strip of metal, 14, having its opposite side portions bent at right angles thereto to provide lateral flages, 15, which are provided with saw teeth, 16. The base, 17, of this channel-shaped saw band is then provided at intervals throughout its length with elongated openings, 18, which are practically the same size as the screws in the direction transversely of the saw bands. From this it will be seen that if there should be any inaccuracy, or variation in diameter of the drum, some portion of each opening 18 in the base of the saw bands will always come over the comparatively small apertures provided in the housing, thus obviating any difficulty in driving the self-threading screws 12 into the apertures in the housing and holding the saw bands in place.

It will be understood that this advantage obtains, not only in originally constructing the drum of the saw cylinder and securing the saw bands thereon, but also in cases where, due to injury to the saw band, the same must be removed and a new saw band substituted therefor. Thus, my improved saw band possesses great advantages in and of itself, that is, considered as an article of manufacture, owing to its ability to be readily utilized for replacing worn out, or broken, saw bands.

I claim:

1. A saw cylinder for cotton extracting machines comprising a shaft, a series of disks secured at intervals thereon, each of which is provided with a continuous peripheral flange extending at right angles to the body of the disk, a sheet metal housing surrounding said disks and supported on said flanges, a series of channel-shaped saw bands encircling said housing at intervals throughout its length each of said saw bands being provided in its base with separated elongated openings, and self-threading screws passed through said openings and driven into apertures in said housing.

2. A saw cylinder for cotton extracting machines comprising a shaft, a series of disks secured at intervals thereon, each of which is provided with a continuous peripheral flange extending at right angles to the body of the disk, a sheet metal housing surrounding said disks and supported on said flanges and secured thereon, a series of channel-shaped saw bands encircling said housing at intervals throughout its length, each of said saw bands being provided in its base with separated elongated openings, extending longitudinally of the band, and self-threading screws passed through said openings and driven into apertures provided in said housing.

3. A saw cylinder for cotton extracting machine comprising a shaft, a series of disks secured at intervals thereon, each of which is provided with a continuous peripheral flange extending at right angles to the body of the disk, and the flanges thereof being provided with apertures, a sheet metal housing surrounding said disks and supported on said flanges and provided with apertures aligning with the apertures in said flanges, a series of channel-shaped saw bands encircling said housing at intervals throughout its length, the base of each of said saw bands being provided with elongated apertures, a portion of each of which is adapted to align with an aperture in said housing, certain of said saw bands coinciding in position with the flanges of said disks, and self-threading screws passed through said elongated openings and driven into the aligning apertures in said housing and flanges.

ORVILLE MITCHELL.